(No Model.)
J. H. O'BRIEN.
BICYCLE ATTACHMENT.
No. 592,438. Patented Oct. 26, 1897.
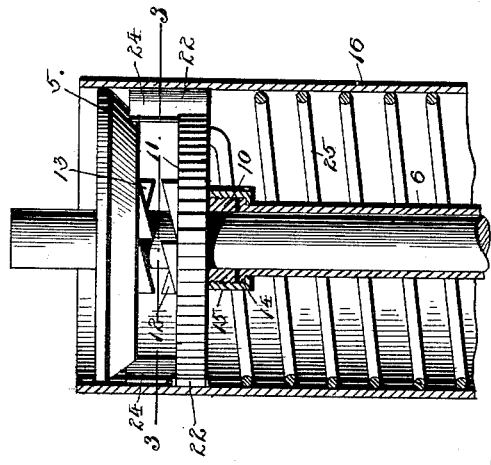
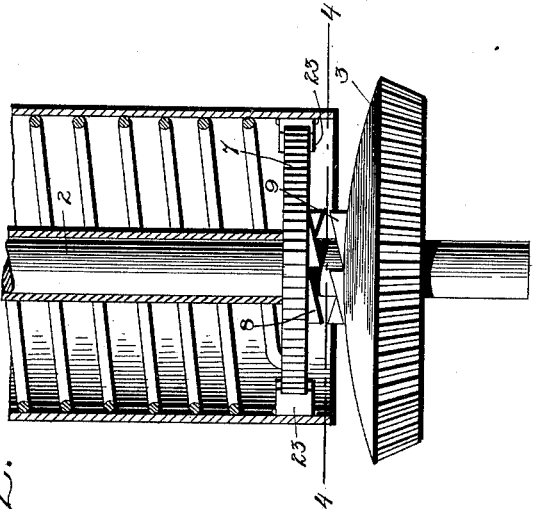
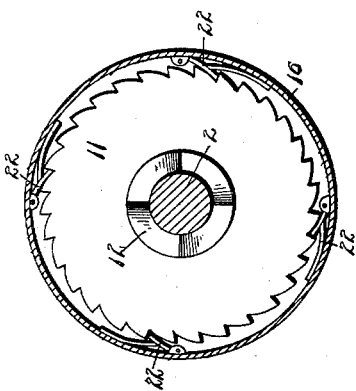
Fig. 3.
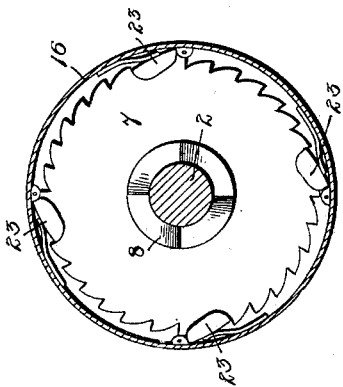
Fig. 4.
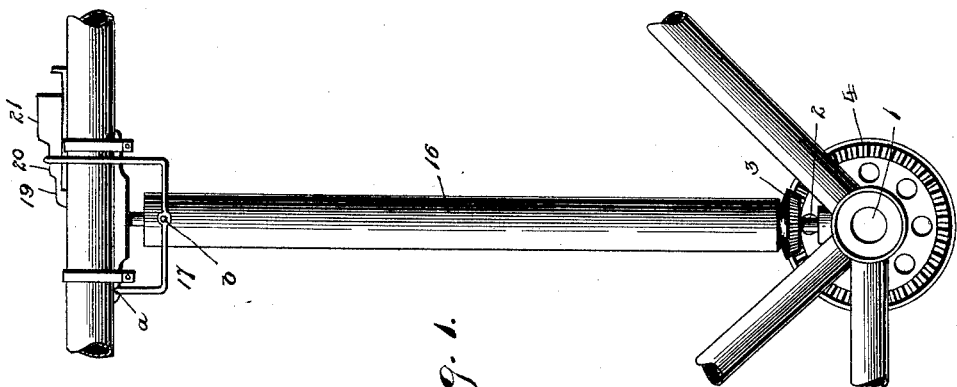
Fig. 1.
WITNESSES
INVENTOR
John H. O'Brien,
By John Wedderburn
Attorney

UNITED STATES PATENT OFFICE.

JOHN H. O'BRIEN, OF NASBY, SOUTH DAKOTA.

BICYCLE ATTACHMENT.

SPECIFICATION forming part of Letters Patent No. 592,438, dated October 26, 1897.

Application filed December 19, 1896. Serial No. 616,332. (No model.)

*To all whom it may concern:*

Be it known that I, JOHN H. O'BRIEN, a citizen of the United States, residing at Nasby, in the county of Lawrence and State of South Dakota, have invented certain new and useful Improvements in Bicycle Attachments; and I do hereby declare the following to be a full, clear, and exact description of the invention, such as will enable others skilled in the art to which it appertains to make and use the same.

This invention has reference to a novel construction in an attachment for vehicles—for instance, bicycles—and it is designed to utilize the energy that is otherwise wasted in descending hills and so store it up that it can be employed to aid in propelling the vehicle.

The invention consists in the features of construction hereinafter fully described and claimed.

In the accompanying drawings, forming a part of this specification, Figure 1 is a side elevation of a portion of a bicycle-frame provided with this improvement. Fig. 2 is a central vertical section of the device, taken on an enlarged scale. Fig. 3 is a transverse section taken on the line 3 3 of Fig. 2. Fig. 4 is a transverse section taken on the line 4 4 of Fig. 2.

It will be understood that this invention is applicable to all kinds of vehicles, but as a matter of convenience the bicycle is selected, and the same will be illustrated and described with especial reference thereto. In the particular construction illustrated the bicycle is shown which is provided with a pedal-shaft that is suitably geared to the propelling-wheel of the machine, and this improvement is illustrated as geared to the pedal-shaft 1. It is understood that the gearing from the main shaft of this device to the propelling-wheel of the bicycle does not form a part of this invention and can be designed as found most convenient. Furthermore, the location of the mechanism with relation to the parts of the bicycle is immaterial, although in the construction illustrated the device is constructed in such a way that it does not interfere with the use of the machine.

In accordance with the principle involved by this invention I employ a main shaft 2, that is mounted in bearings at each end upon the frame of the machine. This shaft 2 is rotatable, but is immovable longitudinally. At its lower end it is provided with a gear-wheel 3, which in the instance illustrated is a beveled gear, that intermeshes with the beveled gear 4 on the pedal-shaft 1. At the upper end of the shaft 2 is a wedge 5, hereinafter referred to. Mounted upon the said shaft 2 and between the wedge 5 and gear-wheel 3 is a hollow shaft 6, that is provided at its lower end with a ratchet-wheel 7, that is rigidly connected thereto and which is provided with a clutch member 8, adapted to interlock with the clutch member 9, carried by the shaft 2 and preferably formed integral with the gear-wheel 3. The said hollow shaft 6 extends upwardly to a point near the upper end portion of the shaft 2 and is swiveled to a sleeve 10, carrying a ratchet-wheel 11 and provided with a clutch member 12 to interlock with a clutch member 13, rigid with the shaft 2 and conveniently formed integral and upon the lower face of the wedge 5. The particular manner in which the swivel connection between the collar 10 and hollow shaft 6 is made consists of a flange 14 at the upper end of said shaft 6 and a screw-threaded flanged sleeve 15 to engage said flange 14 and the screw-threaded portion of the sleeve 10. Surrounding the ratchet-wheels 7 and 11 is a casing 16, that is movable longitudinally with relation to the shaft by means of a lever 17, that is pivoted to the frame of the machine at *a* and to said casing at *b*. The lever is moved by suitable shifting mechanism, which in the instance illustrated consists of a slide having three faces 19, 20, and 21, which engage the lever 17. By moving the slide so that any one of the faces is in contact with the lever the casing 16 is moved to a position to bring the parts into convenient operative positions. The casing is provided interiorly at its upper and lower ends with spring-pawls 22 and 23 to engage the ratchet-wheels 11 and 7. The upper pawls 22 extend upwardly some distance above the ratchets and are provided at their upper end with fingers 24, to be engaged by the wedge 5. Between the ratchet-wheel 11 and ratchet-wheel 7 is a winding-spring 25, connected at its ends with these parts.

The parts being constructed as above described the operation is as follows: As shown in Fig. 2, the casing 16 and the parts carried thereby are in their intermediate position—that is to say, with both of the clutches separated and with the pawls 22 and 23 in engagement with both of the ratchet-wheels. In this way it will be seen that the shaft 2, being geared with the pedal-shaft only, will simply rotate without affecting any part of the mechanism. It is supposed that the rider is about to descend a steep hill. By moving the shifting mechanism to allow the casing 16 to descend the clutch members 8 and 9 interlock, and then the shaft 2 turns against the action of the spring 25, and while it stores up the energy it also acts as a brake to the vehicle. This power can be retained by shifting the mechanism or moving the slide to bring the face 20 in engagement with the lever, which brings the parts to the position shown in Fig. 2. When it is desired to utilize this stored-up energy, the slide is moved to bring the lever in contact with the high face 21, which moves the casing upwardly and throws the pawls 22 in contact with the wedge 5 and interlocks the clutch members 12 and 13. The ratchet-wheel 11, being released from the pawl 22, is at liberty to turn under the influence of the spring 25, and therefore acts through the clutch upon the shaft 2, and consequently upon the driving mechanism of the vehicle.

It is understood, of course, that various changes in the form of this device can be made to conform to the different styles of vehicles upon which it is desired to use the same, and therefore, except in the claims to the specific construction, I do not wish to be limited to the exact construction herein shown.

Having thus described my invention, what I claim as new, and desire to secure by Letters Patent, is—

1. The combination with a rotatable shaft geared to a vehicle-wheel and provided with clutch members, of longitudinally-movable and relatively-rotatable clutch members mounted upon said shaft and adapted to engage the clutch members of the shaft, a winding-spring connected at its ends with said rotatable clutch members, ratchet-wheels carried by said clutch members, pawls to engage said ratchet-wheels, and devices for shifting said rotatable clutch members and for retracting the pawls of one of the ratchet-wheels carried thereby.

2. The combination with a rotatable shaft geared to a vehicle-wheel and provided with clutch members, of a hollow shaft mounted upon said shaft and provided at its ends with relatively-rotatable clutch members and ratchet-wheels, a casing surrounding said parts and provided with pawls to engage said ratchet-wheels, and devices for moving said casing and the parts connected to and carried thereby and for retracting the pawls from one of said ratchet-wheels.

3. The combination with a rotatable shaft geared to a vehicle-wheel and provided with clutch members and a wedge, of a hollow shaft mounted upon said shaft and provided at its ends with relatively-rotatable clutch members and ratchet-wheels, a spring connected at its ends with said clutch members, a movable casing provided with pawls to engage said ratchet-wheels, one set of pawls being provided with fingers to be engaged by said wedge, and devices for shifting said casing.

4. The combination with a rotatable shaft geared to a vehicle-wheel and provided with clutch members, of a rotatable hollow shaft mounted upon said shaft and provided at one end with a clutch member to engage one of the members of the first-mentioned shaft and with the ratchet-wheel, a clutch member and ratchet-wheel swiveled to the other end of said shaft, said clutch member being adapted to engage the other clutch member of the first-mentioned shaft, a spring connected at its opposite ends with the clutch members of the hollow shaft, a casing surrounding said parts and provided with pawls to engage said ratchet-wheels, a lever connected with said casing, and a slide having a plurality of projecting faces situated to engage said lever.

In testimony whereof I have signed this specification in the presence of two subscribing witnesses.

JOHN H. O'BRIEN.

Witnesses:
JNO. R. RUSSELL,
JOHN R. JONES.